April 27, 1965
P. THIBAULT
3,180,279
OVERHEAD CONVEYOR SYSTEM
Filed Dec. 3, 1963
2 Sheets-Sheet 1
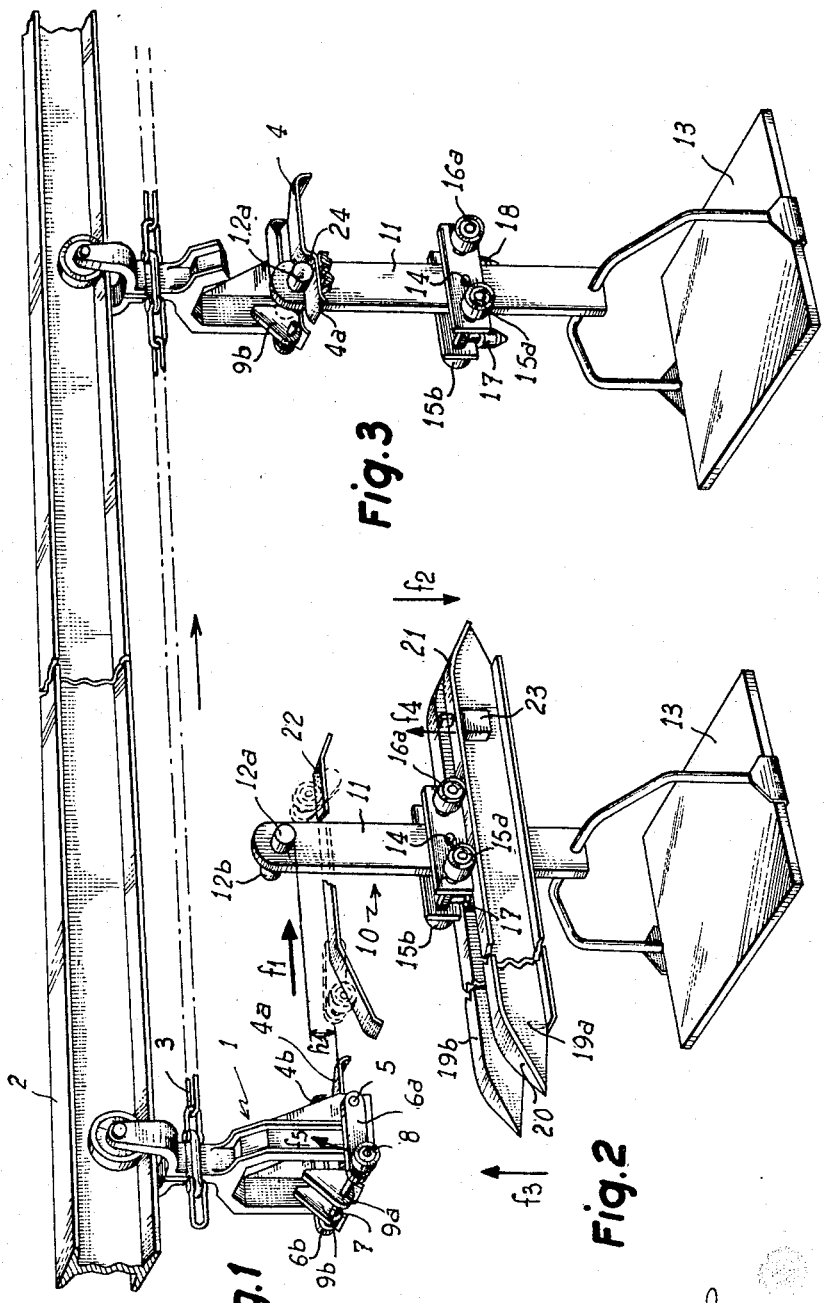

April 27, 1965  P. THIBAULT  3,180,279
OVERHEAD CONVEYOR SYSTEM
Filed Dec. 3, 1963  2 Sheets-Sheet 2
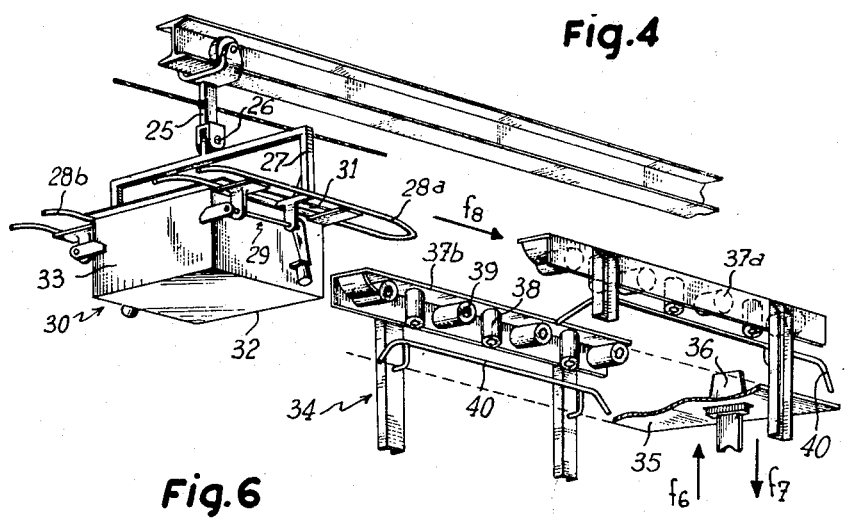
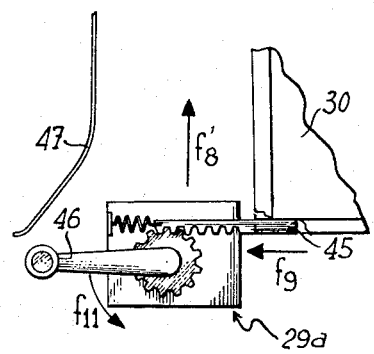
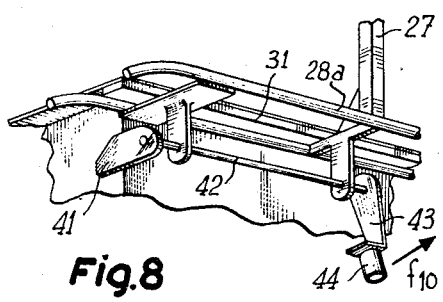
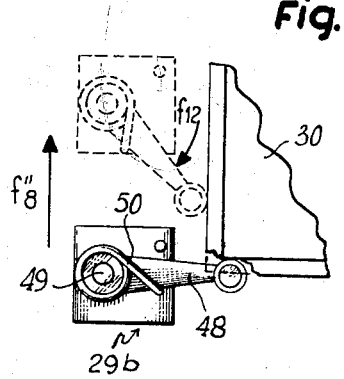
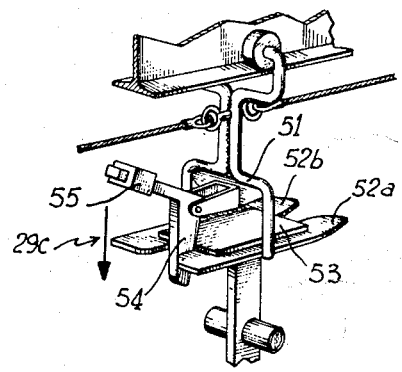
Inventor
Paul Thibault
By Cushman, Darby & Cushman
Attorneys

United States Patent Office 3,180,279
Patented Apr. 27, 1965

3,180,279
OVERHEAD CONVEYOR SYSTEM
Paul Thibault, 30 Ave. de Ceinture,
Enghien-les-Bains, France
Filed Dec. 3, 1963, Ser. No. 327,772
Claims priority, application France, Dec. 5, 1962, 917,680
17 Claims. (Cl. 104—89)

This invention relates to conveyor systems of the type including trolleys travelling on overhead monorails, and load-carrier means suspended from the trolleys.

It is an object of this invention to provide an improved construction for such conveyor systems more particularly in respect to the means serving to couple and uncouple the load carriers with and from the trolleys.

In conveyor systems of the class described, it is usual to provide loading and unloading stations spaced along the path of the conveyor. Load carriers can be positioned at these stations to be hitched up on to an empty trolley as it moves past the station; and load carriers suspended from a trolley can be unhitched and deposited at the station as the loaded trolley moves past it. Various forms of coupling means have been proposed, generally including cooperating means respectively provided on the trolleys and the load-carriers, for effecting the hitching and unhitching operations in a more or less fully automatic manner.

Thus in one widely used form there is provided a fork depending from the trolley and having spaced horizontally jutting arms. The load carrier is provided with a horizontal bar supported above it and adapted to rest across the arms of the fork to suspend the load carrier from the trolley. With such and similar arrangements, it will be readily understood that the coupling and uncoupling operations require the load carrier itself or some other heavily loaded part to be shifted vertically in order, e.g. to raise the coupling bar above the receiving surface of the arms of the trolley and thus allow the load carrier to be picked up by the trolley, or deposited from it, as the case may be. Such vertical shifts imparted to heavily loaded components are extremely undesirable in that they generate severe shocks and jolts which are detrimental to the proper operation and service life of the equipment, are liable to damage fragile loads, require heavily built supporting frames, and consume considerable power.

It is an object of this invention to improve the coupling arrangements of the general class specified so that the hitching and unhitching operations will require only the displacements of lightweight parts that are not loaded. Thus the above enumerated difficulties are largely or completely eliminated.

Another object of the invention is to construct the cooperating coupling elements on the trolley and the load carrier in such a manner that in their coupled condition they will constitute a free-swinging pivotal suspension for the load carrier from the trolley, enabling the load to seek freely its own position of balance. In this aspect of the invention, consequently, it becomes superfluous to provide a suspension pivot on the trolleys themselves, whereby the construction of the trolleys is made simpler, cheaper and sturdier. A related object, in this aspect, is to provide the load carrier with a free-swinging pivotal suspension both when positioned at a waiting station and when coupled to a trolley. Further objects will appear.

The objects and novel features of the invention will be clearly understood from the ensuing description of some exemplary embodiments illustrated in the accompanying drawings, wherein:

FIG. 1 is a perspective view of a trolley suspended from a monorail and constructed according to a first embodiment;

FIG. 2 is a similar view of a loading station having a load carrier thereon according to the same embodiment;

FIG. 3 is a similar view of the load carrier of FIG. 2 suspended from the trolley of FIG. 1. It is observed that FIGS. 1, 2 and 3 in that order can be considered as representing three consecutive stages of a continuous process involving the hitching of a load carrier on to a trolley as the trolley moves past a loading station;

FIG. 4 is a perspective view, as seen from below, relating to a conveyor system according to another embodiment of the invention; the figure illustrates a load carrier suspended from a trolley and an unloading station which the trolley is about to reach for depositing the load carrier thereon;

FIG. 5 is a view similar to FIG. 5, but on an enlarged scale illustrating with greater clarity the movable abutment or latching device used in the embodiment of FIG. 4;

FIG. 6 is a large-scale fragmentary side view illustrating a modified form of latching device which may be incorporated in an improved conveyor system of the general of the general type shown in FIG. 4 or a similar embodiment of the invention;

FIG. 7 is a large-scale fragmentary side view of another modified form of latching device usable with the invention, and of somewhat simplified form; and, FIG. 8 is a perspective view relating to a further simplied embodiment of the invention and illustrating a trolley together with the upper part of a load carrier unit suspended therefrom and embodying a latching device according to another modification thereof.

The conveyor system illustrated in FIGS. 1–3 comprises an overhead monorail 2 over which a plurality of trolley units such as 1 are adapted to travel. Each trolley unit 1 includes an upwardly projecting fork with rollers pivoted on its legs to ride on respective lower flanges of the monorail 2 in a conventional manner, and a downwardly-projecting, load-carrying fork. The trolley unit includes between said two forks a vertical web portion secured through suitable clamping means as shown to a point of a continuous traction chain 3. The lower, load-carrying fork of the trolley unit is provided with automatic coupling mechanism later described in detail.

Associated with the overhead conveyor system is a series of automatic loading-unloading stations spaced along the path of the conveyor. Each such station one of which is shown in FIG. 2, includes a pair of parallel spaced rail sections 19a, 19b supported by means not shown in a position parallel to the monorail 2 and a suitable vertical distance below it. The rails are formed with tapered end ramps as shown, including the input end ramps 20 and output end ramps 21.

A set of load-carrying swing-cars such as 10 are provided for cooperation with the trolley units 1. Each swing-car or load carrier 10 is adapted to be either supported in stationary condition on the rail sections 19 of a loading station, as shown in FIG. 2, or to be suspended from a trolley unit 1 as shown in FIG. 3. The pick-up of a load carrier 10 from a loading station by a trolley 1, and the depositing of a load carrier from a trolley on to a loading station, are arranged to be performed automatically and selectively through the means of the invention as later described.

Each load carrier 10 comprises a vertical suspension arm or bar 11 having a pair of trunnions 12a, 12b projecting in opposite directions from its upper end and having a load platform 13 suspended from its lower end stirrup-fashion as clearly shown. Pivoted on a transverse pivot 14 at an intermediate point of bar 11 is a truck comprising a pair of parallel spaced plates surrounding the bar 11 and interconnected at their ends by means of axles having rollers 15a–15b, and 16a–16b (roller 16b not visible in the drawings) pivoted at their outer ends so as to be capable of resting on the upper flanges of the rail sections 19a, 19b as will be apparent from FIG. 2. The truck further has a pair of vertical rollers 17 and 18 projecting downwardly from it and suitably pivoted on vertical axes, these rollers being preferably tapered as shown, and serving a centering function later described.

The automatic coupling means provided on the trolley units 1 and earlier referred to include a pair of parallel spaced arms 4a, 4b suitably secured to the lower ends of the legs of the load fork of the trolley unit, so as to extend parallel to the general direction of the conveyor. As will be best seen from FIG. 3, the arms are in the form of generally flat coplanar elements having a step 24 formed at intermediate points thereof. Both ends of the arms curve downward as shown. Moreover the leading ends of the arms (in terms of the direction of motion of the conveyor) i.e. the right hand ends in FIG. 3, have their inner sides cut away to form an entrance V.

A pair of vertical latch or abutment plates 9a, 9b are secured in parallel spaced relation to a rod 7 extending across the rear ends of a pair of links 6a, 6b, having their forward ends pivoted at 5 to forward extensions of the trolley load fork branches at the lower ends of the fork. Rollers 8 are pivoted on the outer ends of rod 7.

In the position shown in FIGS. 1 and 3, the abutment plates 9a, 9b have their lower side edges resting by gravity upon the rear ends of the respective arms 4a, 4b, and present their vertical side edges in the forward direction, so as to define with the stepped portions 24 of the arms, a pair of U-shaped recesses or depressions adapted to receive the trunnions 12a, 12b therein as will presently appear.

In the operation of the system as so far described, it will be understood that the trolley 1 of FIG. 1 advances in the direction of arrow f1 under the pull of the chain 3. On approaching a loading station having a load carrier 10 positioned thereat as shown in FIG. 2 and as above described, the arms 4a, 4b pass on opposite sides of the vertical suspension arm 11 of the load carrier, this action being facilitated owing to the entrance V formed at the leading ends of the arms. The dimensioning of the various components and the supporting structure is such that the upper plane of the arms 4a, 4b is at an elevation lower, by a small amount such as indicated at h1, than the lower-most points of trunnions 12a, 12b. Thus as the trolley 1 advances the trunnions pass freely through it and above the arms 4 until they encounter the vertical edges of abutment plates 9a, 9b. Further advance of the trolley now causes the load carrier 10 to be pushed along rail sections 19a, 19b bodily with the trolley, under the action of abutment plates 9a, 9b, until the rollers 15 and 16 of the load carrier truck finally roll down the output ramps 21 at the far ends of said rail sections, whereupon the load carrier 10 is displaced downwards as indicated by arrow f2, so that the trunnions 12a, 12b are brought to rest on the upper surfaces of arms 4, in the afore-mentioned U-shaped depressions defined rearwardly by abutments 9 and forwardly by the steps 24. At this time the load carrier 10 is suspended freely from the trolley as shown in FIG. 3.

As shown in FIG. 2, there is associated with each loading station a movable camming rail section 22 (or a pair of such rails) having means, not shown, for moving it into and out of the position shown, above the rail sections 19. Further, there is associated with one, or each, of the rail sections 19 (section 19a as here shown) a retractable stop device 23, including a stop which may be made to project above the upper surface of the rail section as indicated in broken lines. When it is desired to condition a loading station for the unhitching of a load carrier next presented to that station by a trolley 1, the camrail or camrails 22 are brought into the operative position illustrated, and simultaneously the stop 23 is projected. Under these conditions, the unhitching of the load carrier 10 from the trolley 1 will occur as follows.

As the load carrier approaches the conditioned station, its truck rollers 16 followed by rollers 15 ride up the input ramps 20, and simultaneously the vertical rollers 18 and then 17 engage the inner surfaces of the rail sections 19 to centre the load carrier arm 11 between the rail sections. The load carrier 10 is raised bodily as indicated by arrow f3, lifting the trunnions 12 somewhat above the bottom of their seating recesses on arms 4. Shortly afterwards the rollers 8 of the trolley engage rising input ramps provided at the input ends of the movable cam-rail sections 22, so that after the truck rollers 15, 16 have reached the flat main section of the rails 19, the rollers 8 are lifted as indicated by arrow f5 due to their engagement with the camrails 22, causing the links 6 to rotate (clockwise) about their pivots 5, and raising the abutment plates 9 clear above the path of the trunnions 12. The load carrier truck then strikes projected stop 23 with its front end surface, whereupon the trunnions 12 promptly move off the rear ends of arms 4, depositing the load carrier on the rail sections 19.

If on the other hand the camrail 22 is not advanced to its operative position in the path of rollers 8, and stop 23 is allowed to remain retracted, then the load carrier 10 on reaching the loading station will merely be raised a small amount owing to its truck rollers 15 and 16 riding on to the rail sections 19, and the trunnions 12 will be lifted off their seating surfaces, but since the abutment plates 9 remain in their abutting positions shown, the trunnions are not allowed to escape rearwards from the trolley arms 4, and the load carrier 10 will remain coupled to the trolley throughout the period required for it to move over and past the rail sections 19.

Similarly if it were desired to move a trolley 1 past a loading station without coupling a load carrier 10 at that station to the trolley, it would simply be necessary to actuate stop device 23 to the projected position shown in FIG. 2 and move the camrails 22 to the active position there shown. The camrails then act to move the abutment or latching plates 9 to the releasing positions as above described so that the trunnions 12 are allowed to pass through the trolley 1, with stop 23 positively preventing entrainment of the load carrier 10 by the trolley.

Referring now to the form of embodiment shown in FIGS. 4 and 5, the trolley unit there shown comprises a rod 25 having an upwardly projecting fork with rollers riding the flanges of an overhead monorail, and having pivoted to a clevis 26 at its lower end, a stirrup member 27 having a pair of downwardly projecting legs. The lower end of each stirrup leg is secured to the longitudinal midpoint of a related one of a pair of parallel spaced horizontal sleds or arms 28a, 28b formed with tapered front and rear ends, and somewhat resembling skis or sleds in shape. Supported from the under side of each arm 28 is a movable abutment device generally designated 29 and presently described in detail with reference to FIG. 5. The load carrier in this case is in the form of a simple open-topped box 30 having side flanges 31 adapted to engage over the inner side edges of the respective arms 28 to suspend the load carrier box from the trolley.

In this embodiment an unloading station is provided in the form of a frame 34 supporting a pair of side rail sections or side members 37a, 37b extending parallel to the direction of conveyor movement and spaced somewhat more than the transverse width of the load carrier.

The inwardly facing side walls of the rail members 37 are fitted with centering and guiding rollers shown as including alternately positioned vertical rollers 38 and horizontal rollers 39. The frame 34 further supports a flat platform or flooring 35, shown partly broken away in the figure, and positioned so that its flat upper surface lies below the flat upper surface of side rails 37, a vertical distance somewhat greater than the height dimension of load carrier box 30. Mounted in platform 35 in front of the frame 34 is a retractable stop 36. A pair of camrails 40 having sloping input and output ramps are supported from the frame 34 at an intermediate level, between platform 34 and side members 37.

Referring to FIG. 5, each of the two similar movable abutment devices 29 provided on the trolley comprises a pivot rod 42 supported for rotation from the under surface of the arms 37 in a longitudinal direction and having an abutment plate or latch 41 projecting from its rear end. The forward end of the rod 42 has an arm 43 projecting from it and carrying a roller 44. The arrangement is such that the weight of arm 43 and roller 44 normally holds the assembly in the position shown, wherein the latch 41 projects inwards to engage the rear wall 33 of a box 30 supported from the trolley. As will be presently described, the rollers 44 are arranged to cooperate with the camrails 40 to rotate the latch assemblies to a releasing position.

In the operation of this system, for automatically uncoupling a load carrier box 30 from its suspending trolley and depositing the box on the platform 35 of an unloading station, the stop 36 at said station is preliminarily projected (arrow f6) as shown in FIG. 6. As the suspended load-carrier box 30 and arms 28 approach the station, first the tapered leading ends of the sled-like arms 28, then the sides of the box 30 penetrate between the side members 37, and are guided and centered therebetween by the rollers 39 and 38. Shortly after this, the rollers 44 engage the camrails 40, so that the latch shafts 42 are rotated as indicated by arrow f10 in FIG. 5, and the latches 41 are thus rotated to releasing positions clear of the rear wall of box 30. Then the front wall 32 strikes stop 36, so that the box is left behind as the trolley advances further, and is finally deposited upon the station platform 35.

If it were desired to move a loaded trolley past an uncoupling station without unhitching the box 30 from the trolley at that station, it would be simply required to retain the stop 36 in its retracted or lowered position. The latches 41 would be momentarily moved to retracted position by the camming action of rails 40, but since the box 30 is not arrested by the action of stop 36 on its front wall, its weight of the load would be sufficient to retain the box in position on the sleds 28, until the trolley has moved past the station and the latches have been restored to their latching positions.

In this embodiment, for performing an automatic coupling operation, the platform 35 is positioned at a somewhat higher elevation, i.e. closer to the runways defined by side members 37, than is the case for the automatic uncoupling operation described above. This may be contrived either by providing separate coupling and uncoupling stations with their platforms at different elevations, or if desired, by providing common stations having means, not shown, for selectively raising and lowering the platforms 35 thereof depending on the type of operation to be performed thereat. Considering now a coupling or hitching operation, a box 30 is assumed to be resting on the platform 35, positioned at an elevation such that side flanges 31 of the box are supported high enough to allow the sleds 28 to pass freely thereunder as the trolley carrying the sleds approaches the station. As before, the sleds enter the runways defined by the side members 37 and are centered and guided by the rollers therein. The sleds 28 then pass under the side flanges 31 of the box 30 as just indicated. The latch plates 41 are initially retracted by the camming action of camrails 40 on rollers 44, but on further progress of the trolley, the rollers 44 ride down the output ramps of camrails 40, restoring the latch plates 41 to their latching positions, so that the box 30 is carried along with the trolley and off the platform 35 of the station. The side flanges 31 of the box now bear under the full weight of the load on the sleds 28, and the load carrier box 30 is therefore firmly suspended from the trolley.

If it were desired to cause a trolley to move past a loading station without hitching a box 30 positioned on the station platform on to that trolley, then it is simply necessary in this embodiment to retain stop 36 in its upper projected position. This will prevent the box from advancing and the latches 41 will be moved to their retracted positions allowing the sleds 28 to move past the box.

FIG. 6 illustrates a modified form of movable latching device, generally designated 29a, it being noted that in this figure, the direction of movement of the conveyor is that indicated by arrow f8. This device includes a latch bar 45 mounted for axial sliding movement relative to the trolley, through means not shown, and having rack teeth formed in an end part of it. Bar 45 is shown in its latching position where it engages the trailing wall 33 of a load carrier box 30 partly shown. The rack is in engagement with a gear mounted for rotation in the trolley and having a crank arm 46 projecting from it, with a follower roller pivoted at its end. The roller is adapted to engage a camrail 47 which, in the case of the general arrangement of FIG. 4, would be supported from station frame 34 in the place of camrail 40. On movement of the trolley in the direction of arrow f8, the follower roller engages 47, rotates crank-arm 46 as indicated by arrow f11 and through the gear and rack arrangement displaces latchbar 45 as indicated by arrow f9 to a releasing position.

In the further modified form of latching device 29b in FIG. 7, there is provided a latch arm 48 pivoted at 49 to a suitable support of the trolley and having a latching end engageable with the trailing wall 33 of load-carrier box 30 as shown in full lines. A torsion spring 50 is associated with the pivot of the latch arm to urge it (counterclockwise in FIG. 7) into engagement with said wall 33. The force of the spring is sufficient to push the box 30 along a station platform such as 35 (FIG. 4) as the trolley advances, provided the stop 36 is not projected. Otherwise however, the positive resistance opposed by the projected stop to the advance of the box 30 will cause the latch arm 48 to be rotated in opposition to the spring as indicated at f12 and in broken lines, and the end roller provided on the latch arm will ride in engagement with the under surface of the box. This simplified latching arrangement is especially suitable for relatively small-capacity conveyor systems according to the invention.

Another simplified form of conveyor system is shown in FIG. 8. The trolley unit, in this case, provides an upwardly directed stirrup having a pair of rollers riding the flanges of an overhead rail and a downwardly directed stirrup 51 having a pair of parallel spaced horizontal sled-like arms 52a, 52b secured at midpoints thereof to the lower ends of the said stirrup. Associated with the trolley is a load carrier only the upper suspension part of which is shown as comprising a horizontal plate 53 adapted to rest on the upper surfaces of sleds 52 and a depending strip passing between the sleds and having a load carrier capacity of any type suspended from its lower end. The movable latching device 29c in this embodiment comprises a cranked lever 54 having its midpoint pivoted in a suitable clevis supported from stirrup 51 between its legs, the lever 54 including a downwardly projecting latching end, and an outwardly projecting branch carrying a counterweight 55. The latching branch of the cranked lever 54 is normally held by the weight of counterweight 55 in engagement with the trailing end of the load carrier plate 53 as shown, but is adapted to be swung (clockwise in FIG. 8) to a releasing position in case of a positive resistance encountered by the forward end of plate 53, as on engagement of it with a stop such as 36, FIG. 4. Thus the device 29c constitutes a form of resilient latching device similar to the one shown in FIG. 7, but wherein the force of gravity replaces spring force as the means biasing the latch to engaging position.

The general operation of an improved conveyor system provided with the modified latching devices of any of the types shown in FIGS. 6, 7 and 8, will be readily understood in the light of explanations previously given and is not believed to require further description.

It will be seen that in all of the embodiments of the invention described, the improved coupling means essentially comprise a first means carried by the conveyor trolley and shown in the form of the parallel spaced horizontal sled or ski-like arms 4 (FIGS. 1-3), 28 (FIGS. 4-5) or 52 (FIG. 8), and second means carried by the load carrier unit and provided in the form of the trunnions 12 (FIGS. 1-3), flanges 31 (FIGS. 4-5) or plate 53 (FIG. 8) respectively. In each case, moreover, one of these cooperating means has associated therewith a latching arrangement, specifically the latches 9 (FIGS. 1-3), 41 (FIGS. 4-5), 45 (FIG. 6), 48 (FIG. 7) or 54 (FIG. 8), and the other of said means has an element abutted by such latching means when in latching position, specifically the trunnions 12 (FIGS. 1-3), box wall 33 (FIGS. 4-7) or trailing end of plate 53 (FIG. 8). It will be understood that the relationship between the latching means and the means abutted thereby may be reversed, that is the latching means may be provided on the load-carrier and the abutted means on the trolley, with only minor changes in the design of the associated parts.

All coupling and uncoupling operations according to the invention involve as described only small displacements of parts that are not under load and thus are easily and reliably effected with small consumption of energy. Another advantage common to all of the forms of the invention described is that one of the cooperating coupling means is moved away from the path of the other means immediately on arrival of the trolley at the station, and prior to the point where the uncoupling is actually required, and is moved back into latching engagement as the trolley leaves the station. Thus smooth, and relatively impact-free reliable operation is ensured, in addition to ensuring that coupling and uncoupling operations involve only unloaded parts as earlier indicated.

With special reference to the embodiment of FIGS. 1-3, it will be observed that when the trunnions 9 of the load carrier 10 are seated in their recesses defined by the stepped portions 24 of the arms 4, and the latches 9, the said trunnions are supported in the manner of horizontal pivots in their bearings, allowing the load-carrier structure suspended therefrom to swing freely in order to seek out its attitude of equilibrium, wherein the center of gravity of the load is vertically aligned with the axis of the pivots or trunnions 12. Further, the free-swinging character of the load suspension is not substantially affected during coupling and uncoupling operations, since the swinging pivot 14 of the load carrier truck immediately and smoothly replaces the swinging pivot 12 as soon as the load carrier enters a station. This further contributes to the smoothness of the load handling operations.

Another advantage especially desirable in connection with single-track conveyors of the type specified is that the loads can at all times be allowed to remain on the load carriers so that the work of the handling personnel can be made substantially independent from the rate of circulation of the loads through the conveyor system, rather than requiring to be synchronized with it. For example, shunting means may be associated with the rails 19 of the loading-unloading station of FIGS. 1-3, whereby loaded carriers 10 may be side tracked to waiting stations at which the handling operators may operate on the loads at a normal rate regardless of the rate of circulation on the conveyor line. It has thus been found possible to increase substantially the rate of input of loads into the conveyor and/or the feed velocity without increasing the number of operators.

It will be evident that various modifications other than those specifically referred to above may be conceived without exceeding the scope of the invention. As one further example, in the embodiment of FIGS. 1-3, the camming ramps 20, 21 instead of being provided on the station rail sections 19, may be associated with the overhead rail 2, so as to cause the trolley to dip as it is moving over and past the station.

What I claim is:

1. A conveyor system including an overhead rail, at least one trolley arranged to travel along the rail, at least one station underlying the rail, at least one load carrier supportable at the station, and means for alternatively supporting the carrier at the station and suspending it from the trolley comprising: supporting means on the carrier and a supporting surface on the trolley adapted to receive the supporting means thereon for suspending the carrier from the trolley under gravity, cooperating abutment elements on the trolley and carrier, one of said elements being displaceable between a first position in which it intercepts the path of relative motion of the other element when the carrier is supported at the station and the trolley moves past the station whereby said elements will interengage as the supporting surface of the trolley moves past the supporting means of the carrier and will connect the carrier for movement with the trolley, and a second position in which said displaceable element is clear of said path of relative motion so as to allow the supporting surface of the trolley to move freely past the supporting means of the carrier supported at said station, means normally holding the displaceable element in said first intercepting position, and means operable as the trolley moves past the station, for camming said displaceable element temporarily to its second, clear position.

2. A system according to claim 1, wherein said displaceable abutment element is provided on the trolley and said camming means is associated with the station.

3. The system claimed in claim 1, wherein the means normally holding the movable element in its intercepting position comprises the force of gravity.

4. The system claimed in claim 1, wherein the means normally holding the movable element in its intercepting position comprises a spring.

5. A conveyor system including an overhead rail, at least one trolley arranged to travel along the rail, at least one station underlying the rail, at least one load carrier supportable at the station, and means for alternatively supporting the carrier at the station and suspending it from the trolley comprising: a pair of generally horizontally-coplanar, parallel-spaced arms projecting from the trolley longitudinally of the conveyor, supporting means on the carrier having under surface areas seatable on the upper surfaces of said arms for suspending the carrier from the trolley under gravity, a generally vertical abutment surface on the carrier, a cooperating displaceable abutment element on the trolley displaceable between a first position in which it intercepts the path of relative motion of said abutment surface when the carrier is supported at the station and the trolley moves therepast whereby said element will engage said abutment surface as the trolley arms move past the supporting means of the trolley and will connect the carrier for movement with the trolley, and a second position in which said displaceable element is clear of said path of relative motion so as to allow the supporting arms of the trolley to move freely past the supporting means of the carrier supported at said station, means normally holding the displaceable element in said first, intercepting position, and means associated with said station operable as the trolley moves therepast for camming said displaceable abutment element temporarily to its second, clear position.

6. The system claimed in claim 5, wherein the supporting means comprises a pair of side flanges of the carrier projecting in opposite lateral directions and seatable on upper surface areas of said arms of the trolley.

7. The system claimed in claim 5, wherein said supporting means comprises a generally flat plate having lateral areas of its under surface seatable on upper surface areas of said trolley arms.

8. The system claimed in claim 5, wherein said supporting means comprises a pair of trunnions projecting in opposite lateral directions from the carrier and seatable on upper surface areas of said trolley arms.

9. The system claimed in claim 5, wherein said camming means comprises a camrail extending alongside the station.

10. The system claimed in claim 1, including a stop at the station displaceable between a retracted position in which it allows the carrier to be moved freely off the station by the trolley in the engaged condition of said abutment elements and a projected position in which it arrests such movement of the carrier.

11. The system claimed in claim 10, wherein said displaceable abutment element is provided on the trolley and said camming means comprises a portion of the carrier.

12. The system claimed in claim 1, wherein the supporting means of the carrier is received on the supporting surface of the trolley in pivoted relation therewith so as to support the carrier in free-swinging suspended relation from the trolley.

13. A conveyor system including an overhead rail, at least one trolley arranged to travel along the rail, at least one station underlying the rail, at least one load carrier supportable at the station, and means for alternatively supporting the carrier at the station and suspending it from the trolley comprising: a pair of generally horizontally-coplanar, parallel-spaced arms projecting from the trolley longitudinally of the conveyor, a pair of trunnions projecting in opposite lateral directions from an upper end part of the carrier and receivable on said trolley arms for suspending the carrier in free swinging relation from the trolley, latching means on the trolley displaceable between a latching position in which the latching means engages trailing surfaces of the trunnions to confine them on said arms and a releasing position, and means associated with said station for displacing the latching means between said positions.

14. The system claimed in claim 13, wherein said arms are formed with surfaces engageable with leading surfaces of the trunnions to confine them on said arms in a forward direction.

15. The system claimed in claim 13, including pivoted support means on the carrier for supporting it in free-swinging relation at said station.

16. The system claimed in claim 13, including a truck pivoted to the carrier below said trunnions thereof and having means for supporting the truck on the station.

17. A conveyor system including an overhead rail, at least one trolley arranged to travel along the rail, at least one station underlying the rail, at least one load carrier supportable at the station, and means for alternatively supporting the carrier at the station and suspending it from the trolley comprising: a pair of generally horizontally-coplanar, parallel-spaced arms projecting from the trolley longitudinally of the conveyor, said carrier comprising a vertical suspension arm, a pair of trunnions projecting in opposite lateral directions from an upper end part of the suspension arm and receivable on said trolley arms for pivotally suspending the carrier from the trolley in free-swinging condition, displaceable latching means on the trolley selectively operable for blocking and releasing said trunnions with respect to said arms, a truck pivoted to the suspension arm at a vertically intermediate point thereof and a load receiver attached to a lower end of said suspension arm, said station including a pair of parallel-spaced rail sections between which said suspension arm of the carrier is adapted to pass and on the upper surface of which said truck is adapted to rest so as to support the carrier in free-swinging condition at said station.

No references cited.

MILTON BUCHLER, *Primary Examiner.*